US006906138B2

(12) United States Patent
Quinn

(10) Patent No.: US 6,906,138 B2
(45) Date of Patent: Jun. 14, 2005

(54) STRINGED INSTRUMENT BOW RESIN

(76) Inventor: Thomas Harry Quinn, 950 Fairmount Ave., Saint Paul, MN (US) 55105

( * ) Notice: Subject to any disclaimer, the term of this patent is extended or adjusted under 35 U.S.C. 154(b) by 441 days.

(21) Appl. No.: 09/945,928

(22) Filed: Sep. 4, 2001

(65) Prior Publication Data

US 2002/0058738 A1 May 16, 2002

Related U.S. Application Data

(60) Provisional application No. 60/231,004, filed on Sep. 8, 2000.
(51) Int. Cl.⁷ .................................................. C08F 8/00
(52) U.S. Cl. ..................... 525/191; 525/192; 525/210; 525/211; 525/216; 525/241; 526/335; 526/346
(58) Field of Search ................................ 525/191, 192, 525/210, 211, 216, 241, 232; 526/335, 346; 524/440

(56) References Cited

U.S. PATENT DOCUMENTS

| 4,038,348 A | * | 7/1977 | Kompanek ................. 261/36.2 |
| 4,164,427 A | * | 8/1979 | Godfrey ..................... 106/218 |
| 4,413,067 A | * | 11/1983 | Tsuchiya et al. ............ 523/172 |
| 4,545,926 A | * | 10/1985 | Fouts et al. ................. 252/511 |
| 4,822,653 A | * | 4/1989 | Kauffman et al. ......... 428/34.2 |

* cited by examiner

Primary Examiner—Edward J. Cain
(74) Attorney, Agent, or Firm—Merchant & Gould P.C.

(57) ABSTRACT

An improved stringed instrument bow resin made from synthetic hydrocarbon resin and optionally modified with olefinic and elastomeric polymers, fillers, plasticizers, colorants, and antioxidants. The composition is hypoallergenic, hydrophobic, non-corrosive, and resistant to oxidation.

12 Claims, No Drawings

STRINGED INSTRUMENT BOW RESIN

I hereby claim the benefit under 35U.P.S.C.119(e) of provisional patent No. 60/231,004 filed on Sep. 8, 2000.

FIELD OF THE INVENTION

This invention relates to improved stringed instrument bow resin compositions utilizing synthetic hydrocarbon tackifying resins and blends of these resins with modifiers such as plasticizers, oils, and polymers.

BACKGROUND OF THE INVENTION

Rosin is a hard, brittle, naturally occurring substance derived from the distillation of oil of turpentine, which is itself derived from pine trees. Rosin has been used for centuries to create friction between stringed instrument bow hairs and the strings of instruments like violins. Rosin is typically supplied in a small cake form that is rubbed onto the hairs of a bow in order to give the bow hairs enough tackiness to cause the instrument strings to vibrate when rubbed across the strings. It is the vibration of the strings that causes the sound of the instrument. For this invention, bow rosin is defined as any naturally derived gum, wood, or tall oil rosin which is applied to the strings of a bow in order to cause friction with the strings of an instrument and produce sound.

Rosin is primarily comprised of abietic acid, isomers of abietic acid, and numerous other naturally occurring compounds. Because it is naturally derived, and because of its organic acid chemical structure, rosin has at least five distinct drawbacks:
1. Rosin is hydrophilic and absorbs water. This causes the tackiness of the rosin to vary according to ambient humidity, which affects the sound of the instrument.
2. Rosin is susceptible to oxidation. Rosin becomes a fine powder, when applied to bow hairs. This powder has a high surface to volume ratio and rapidly reacts with ambient oxygen. As rosin oxidizes, it loses tack and essentially loses its effectiveness.
3. Rosin is a naturally occurring resin suspected of causing allergic reactions in susceptible people.
4. Rosin is primarily an organic acid and potentially corrosive. Rosin dust typically accumulates on the surface of the instrument and bow and can corrode the wood's varnish.
5. Rosin is very brittle and tends to break easily.

It is possible to slightly improve upon the properties of rosin and minimize some of these drawbacks by adding polymers to improve impact resistance, adding antioxidants to minimize oxidation, chemically reacting rosin by hydrogenation or esterification to minimize oxidation, and rosin can be neutralized with bases to minimize corrosion. However, none of these modifications, in whole or in combination, can significantly improve upon the properties of the bow rosin used today.

SUMMARY OF THE INVENTION

The present invention discloses that the use of synthetic hydrocarbon resins, and compounds thereof, that are substantial improvements over the properties of rosin while surprisingly producing musical tone at least as good as rosin.

For this invention, synthetic hydrocarbon resins are defined as resins resulting from controlled chemical reactions such as polyaddition or polycondensation between well-defined reactants, that do not themselves have the characteristic of resins. Bow resins are defined as synthetic hydrocarbon resins that are applied to bow hairs to cause friction on the strings of an instrument to produce sound.

Examples of synthetic hydrocarbon resins of the present invention include indene-coumarone resins, aromatic $C_9$ resins, aliphatic $C_5$ resins, $C_5/C_9$ blended resins, dicyclopentadiene resins, alpha-methylstyrene resins, and alpha-methylstyrene vinyl toluene resins, polyterpene resins, and hydrogenated versions of each of these.

These substances improve upon the properties of rosin in at least five ways:
1. They are hydrophobic. They resist the absorption of water and their tack is nearly unaffected by ambient humidity. This results in a more consistent sound from one moment of time over another regardless of humidity.
2. They are saturated hydrocarbon compounds that are resistant to oxidation. They are virtually non-reactive with ambient oxygen, even in a finely powdered form, and thus resist losing their tack or effectiveness over time.
3. They are synthetic materials significantly less prone to being allergenic than rosin.
4. They are chemically inert with regard to instrument varnishes and do not corrode the varnishes.
5. The addition of small amounts of selected polymers decreases brittleness making these compounds less prone to breakage.

Despite these substantial differences from rosin, these synthetic hydrocarbon resins of the present invention unexpectedly continue to produce fine musical tone at least as good as rosin. Furthermore, the variety of tackifiers and modifiers disclosed in this invention makes it possible to fashion compounds with various degrees of tack and hardness and to customize the bow resin according to the desired characteristics.

DETAILED DESCRIPTION OF THE INVENTION

Any bow rosin or bow resin must itself possess enough tack at room temperature to repeatedly grip and release the strings as the bow hairs are drawn across the strings.

This generates a saw-tooth waveform in the strings, but this vibration causes virtually no sound itself because the surface area of the string is too small to cause much air to vibrate as sound waves. The body of the stringed instrument is designed to transmit and amplify the vibrations of the string causing larger amounts of air to move, creating audible sound.

There are many test methods designed to measure the tack of a substance. Rolling Ball Tack, Polyken Tack, and Loop Tack, are common methods used in the pressure sensitive tape industry. Unfortunately these, and other common tack tests, are not suitable for measuring the hard, brittle tack of bow resins. The inventor has found that Ring and Ball Softening Point (ASTM D6493-99) of the resin is a good predictor of tack as it relates to bow resin. Synthetic hydrocarbon resins suitable for stringed instrument bows have Ring and Ball Softening Points in the range from 60C to 110C, preferably in the range from 70C to 90C.

The synthetic hydrocarbon resins preferred in this invention include indene-coumarone resins, aromatic $C_9$ resins, aliphatic $C_5$ resins, $C_5/C_9$ blended resins, dicyclopentadiene resins, alpha-methylstyrene resins, and alpha-methylstyrene vinyl toluene resins, polyterpene resins, and hydrogenated versions of each of these. The main source of raw materials for the production of hydrocarbon resins are the pyrolysis of coal in coke ovens, the pyrolysis of petroleum fractions in steam crackers, and terpene monomers mainly derived from naval stores, paper production, and orange peels.

Indene-coumarone resins are polymerized from the light oil distillate fraction derived from coal tar, which is itself a byproduct of the coal carbonization process. This light oil distillate is a complex mixture primarily comprised of indene and coumarone. Commercial examples of indene-coumarone resins include the Cumar® series from the Neville Chemical Company.

More commonly, synthetic hydrocarbon resin monomers are derived from the pyrolysis of natural gas and petroleum as byproducts of ethylene and propene production. This so-called steamcracking process results in several fractions used to polymerize synthetic hydrocarbon resins including $C_5$ streams containing linear and cyclic olefins to product aliphatic resins, $C_9$ streams containing unsaturated aromatics to produce aromatic resins, and dicyclopentadiene (DCPD) streams to produce dicyclopentadiene resins.

The crude $C_5$ fraction consists of olefins and diolefins such as isoamylene, DCPD, isoprene, and piperylene, which after processing and polymerization produce aliphatic resins. Commercial examples of aliphatic $C_5$ resins include Wingtack® 95 from Goodyear Chemical Company and Escorez® 1310 from ExxonMobil Chemical Company.

Aromatic $C_9$ resins are polymerized from monomers in feedstreams containing high boiling (160–200C) aromatic distillates such as indene, vinyltoluene, alpha-methylstyrene, styrene, naphthalene, methylindenes, as well as non-reactive aromatics. Commercial examples of aromatic $C_9$ resins include the Norsolene® series from Sartomer Chemical and Escorez® 7312 from ExxonMobil Chemical Company.

DCPD resin is polymerized from dicyclopentadiene derived as a distillate of $C_5$ fractions. This DCPD fraction may also contain other dienes such as isoprene, butadiene, and methylcyclopentadiene. DCPD resins are commonly hydrogenated to improve color and oxidative stability. A commercial example of hydrogenated DCPD resin is the Escorez® 5380 from ExxonMobil Chemical Company.

Pure unsaturated monomers such as styrene, alpha-methylstyrene, and vinyltoluene can be polymerized alone, or as blends with each other to produce aromatic pure monomer resins. The Kristalex® series from Hercules Chemical is an example of a pure monomer alpha-methylstyrene resin. The Piccotex® series from Hercules is an example of an alpha-methylstyrene vinyltoluene resin. These resins are commonly hydrogenated. An example of hydrogenated alpha-methylstyrene resin is the Regalrez® series from Hercules Chemical Company.

The feedstock for the production of polyterpene resins are natural terpene monomers such as alpha-pinene, beta-pinene, and dipentenes such as D-limonene. Alpha and beta-pinene monomers are derived from turpentine oil, which along with rosin, is derived from pine trees. D-limonene is derived from citrus fruits, mostly by extraction from orange peels. A commercial example of a polyterpene resin is the Sylvares® TR-1085 from Arizona Chemical Company. Some polyterpene resins are polymerized from blends of terpene monomer and aromatic monomers such as styrene. An example of such a styrenated polyterpene resin is the Sylvares® ZT 5100 resin from Arizona Chemical Company.

These resins are useful as bow resins at concentrations ranging from about 60 wt-% to 100 wt-%, preferably from about 80 wt-% to 100 wt-%, and more preferably from about 90 wt-% to 100 wt-% of the total bow resin composition.

The amount of tackifying resin varies depending upon the degree of desired tack and hardness, and other modifying additives such as thermoplastic polymers, plasticizers, oils, fillers, antioxidants, and colors.

Thermoplastic polymers useful herein include homopolymers, copolymers, and terpolymers of ethylene and rubbery block copolymers. Thermoplastic polymers are useful at concentrations ranging from 0 wt-% to 20 wt-%, preferably from 0 wt-% to 5 wt-%, and are used to modify tack, impact resistance, and film forming properties.

Copolymers and terpolymers of ethylene are polymers having at least one comonomer selected from the group consisting of vinyl esters of a saturated carboxylic acid wherein the acid moiety has up to 4 carbon atoms, unsaturated mono- or dicarboxylic acids are of 3 to 5 carbon atoms, a salt of the unsaturated acid, esters of the unsaturated acid derived from an alcohol having 1 to 8 carbon atoms, and mixtures thereof, and C3–C20 alpha-olefins.

Preferred ethylene/unsaturated carboxylic acid, salt and ester interpolymers include ethylene/vinyl acetate (EVA), ethylene/acrylic acid (EEA) and its ionomers, ethylene/methacrylic acid and its ionomers, ethylene/methyl acrylate (EMA), ethylene/n-butyl acrylate (EnBA), ethylene/hexene, ethylene/octene, as well as various derivatives thereof that incorporate two or more comonomers.

Commercial examples of useful polymers include ethylene homopolymers available from Eastman Chemical Co. under the tradename of Epolene®, EVA copolymers available from Du Pont in Wilmington, Del. under the tradename of Elvax®, EnBA copolymers available from ExxonMobil Chemical Co. under the tradename of Escorene®, EMA copolymers from ExxonMobil under the tradename of Optema®, and ethylene/hexane copolymers from ExxonMobil under the tradename of Exact®.

The rubbery block copolymers include those polymers having the general configuration A-B diblock, A-B-A triblock, A-B-A-B-A-B multiblock, radial block copolymers, and star polymers. Commonly, the A block is styrene and the B block may be butadiene, isoprene, ethylene/butylenes and ethylene/propylene although there are others as well. Examples of useful rubber block copolymers include the Kraton® G series of styrene-ethylene/butylene-styrene block copolymers, the Kraton® D series of styrene-isoprene-styrene block copolymers, and styrene-butadiene-styrene block copolymers, all available from Shell Chemical Co. in Houston Tex.

Optionally, oils, plasticizers, or liquid resins may be utilized in the present invention to modify tack, Ring and Ball Softening Point, and film forming properties. These include paraffinic and napththenic process oils (Shellflex® 371 from Shell Oil Company), mineral oils (Kaydol® Oil from Witco Chemical), liquid elastomers including polybutenes (Indopol® from Amoco Chemical Company) and polyisobutylenes (Oppanol® from BASF), benzoate plasticizers, and liquid tackifying resins (Regalrez® 1018 from Hercules Chemical Company).

A stabilizer or antioxidant is preferably used in the bow resin composition of the present invention. These compounds are added to protect the resin from degradation caused by reaction with oxygen and prolong the shelf life and functional use of the bow resin. Such antioxidants are commercially available from Ciba-Geigy in Hawthorne, N.Y. and include Irganox 1010 and Irganox 1076 and are hindered phenols. BNX DLTDP® is an example of a thioester type of stabilizer from Mayzo, Inc. These compounds are added in small amounts and have no effect on other physical properties.

Other compounds can be added to affect color, opacity, hardness, and tack. Examples include fillers, pigments, dyes, and odors to name a few. Objects, such as miniature plastic instruments, bright crystals, metallic pigment and flakes, mica, organic and inorganic pigments can be added for aesthetic effects. Metallic particles and flakes, preferably gold and silver, can be added to the bow resin composition of the present invention to modify flaking characteristics and tack.

The bow resins of the present invention can be prepared using high shear mixers, extruders, or upright mixers. Typically the tackifying resins, plasticizers, oils, and liquid resins are heated to about 150C and mixed until clear and homogeneous. If thermoplastic polymers are used, they are typically slowly added after the other components have melted and dissolved with agitation. After the mixture becomes homogeneous, it is poured into molds of the desired shape and cooled after which it becomes a solid.

The resulting bow resins of the present invention are typically hard, clear solids with a small amount of surface tack. When rubbed on the hairs of a violin bow, they break into fine dust-like particles and coat the hairs, imparting tack and enabling sound.

EXAMPLES

Table I contains examples illustrative of bow resins of the present invention. These examples are not meant to limit the invention in any way but are meant to illustrate the inventive concept.

TABLE I

| RESINS | Example 1 | Example 2 | Example 3 | Example 4 |
|---|---|---|---|---|
| Escorez ® 5380 | 99.9% | 89.9% | — | 94.9% |
| Regalrez ® 1018 | — | 10% | — | — |
| Kristalex ® 3070 | — | — | 99.9% | — |
| Elvax ® 210 | — | — | — | 5% |
| Irganox ® 1010 | 0.1% | 0.1% | 0.1% | 0.1% |

Example 1

99.9 grams of hydrogenated DCPD resin (Escorez 5380), with a R&B Softening Point of 80C, was combined with 0.1 grams of hindered phenol antioxidant (Irganox 1010) and melted at 150C. The mixture was blended until smooth, and poured into a silicone mold and cooled to form a cake about 3 cm in diameter and 1 cm thick. When applied to a bow, the bow resin in Example 1 resulted in a clear musical tone. Over repeated uses there was minimal buildup of resin dust on the instrument or bow hairs. Use under humid ambient conditions resulted in no perceptible change in resin tack or musical tone.

Example 2

Regalrez 1018 is a low softening point, liquid, hydrogenated $C_9$ hydrocarbon resin modifier that was added to the resin in Example 1 at a 10% level. Its purpose was to soften the overall bow resin mixture and to increase tack. Softer resins with more tack are often preferred for larger stringed instruments such as violas and basses. Example 2 is indeed softer and tackier than Example 1. The tone produced on a violin is mellower than that of Example 1. It also applies thicker to the bow hairs and builds up more on the strings.

Example 3

Kristalex® 3070 is an alpha-methylstyrene resin with a 70C R&B softening point from Hercules Chemical Company. It is similar to Example 1, but with a lower R&B softening point. The tone it produced on a violin was clear, but less mellow and harsher than Example 1 or Example 2.

Example 4

94.9 grams of a hydrogenated DCPD resin (Escorez 5380), with a Ring and Ball Softening Point of 80C, was combined with 0.1 grams of hindered phenol antioxidant (Irganox 1010) and melted at 150C. 5 grams of Elvax® 210 (28% vinyl acetate and 400 melt index) was slowly mixed in with agitation until the mixture was homogeneous. The molten mixture was poured into molds and cooled as in the previous examples. The resulting bow resin was rubbed on a violin bow and used to produce sound. Example 4 was found to produce clear, mellow tones. Because of the film forming characteristics of the EVA, Example 4 formed a thicker film on the strings. It also made the solid more impact resistant and less prone to break when dropped.

I claim:

1. A method of preparing a bow string to play a stringed instrument comprising the steps of applying an effective amount of a synthetic hydrocarbon resin to the string and obtaining a clear tone from the instrument.

2. The method of claim 1 wherein the resin also comprises about 1 to 10% of second synthetic hydrocarbon resin.

3. The method of claim 2 wherein the synthetic hydrocarbon resin has a Ring and Ball Softening Point of 60° C. to 100° C.

4. The method of claim 3 wherein the synthetic hydrocarbon resin has a Ring and Ball Softening Point of 70° C. to 90° C.

5. The method of claim 2 wherein the synthetic hydrocarbon resin is hydrogenated.

6. The method of claim 2 wherein the synthetic hydrocarbon resin is a hydrogenated dicyclopentadiene resin.

7. The method of claim 2 wherein the synthetic hydrocarbon resin is a hydrogenated aromatic $C_9$ resin.

8. The method of claim 2 wherein the synthetic hydrocarbon resin is an alpha-methylstyrene resin.

9. The method of claim 2 wherein the synthetic hydrocarbon resin is an alpha-methylstyrene -vinyltoluene copolymer resin.

10. The method of claim 1 wherein the plasticizer is selected from the group consisting of mineral oil, paraffinic oil, liquid hydrocarbon resin or benzoate plasticizer.

11. The method of claim 2 wherein the resin comprises a synthetic hydrogenated hydrocarbon resin and an effective amount of an anti-oxidant stabilizer.

12. The method of claim 11 wherein the stabilizer is selected of the group consisting of a hindered phenol stabilizer, a thioester stabilizer or mixtures thereof.

* * * * *